US008611434B2

(12) United States Patent
Mitasaki et al.

(10) Patent No.: US 8,611,434 B2
(45) Date of Patent: Dec. 17, 2013

(54) IMAGE PROCESSING METHOD AND APPARATUS, IMAGE PROCESSING PROGRAM, AND STORAGE MEDIUM WHICH STORES THE PROGRAM

(75) Inventors: Tokinobu Mitasaki, Tokyo (JP); Kazuto Kamikura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 981 days.

(21) Appl. No.: 12/306,589

(22) PCT Filed: Jul. 2, 2007

(86) PCT No.: PCT/JP2007/063240
§ 371 (c)(1),
(2), (4) Date: Dec. 24, 2008

(87) PCT Pub. No.: WO2008/004521
PCT Pub. Date: Jan. 10, 2008

(65) Prior Publication Data
US 2009/0202001 A1    Aug. 13, 2009

(30) Foreign Application Priority Data

Jul. 3, 2006  (JP) ................................ 2006-182931

(51) Int. Cl.
*H04N 7/12*   (2006.01)
(52) U.S. Cl.
USPC ................................ 375/240.29; 375/240.28
(58) Field of Classification Search
USPC ................ 375/240.29, 240.2, 240.28, 240.27
See application file for complete search history.

(56) References Cited

U.S. PATENT DOCUMENTS 5,181,105 A * 1/1993 Udagawa et al. ............. 358/520
5,490,233 A * 2/1996 Kovacevic .................... 704/230
(Continued)

FOREIGN PATENT DOCUMENTS

EP    0 907 255 A1    4/1999
EP    1 239 679 A2    9/2002
(Continued)

OTHER PUBLICATIONS

Gonzalez, Rafael C., et al., "Digital Image Processing," Technosphere, Moscow, 2006, Sections 4.2.3-4.4.5, pp. 242-289, translation of 2002 edition, Prentice Hall, pp. 156-191.
(Continued)

*Primary Examiner* — Eleni Shiferaw
*Assistant Examiner* — Abu Sholeman
(74) *Attorney, Agent, or Firm* — Harness, Dickey & Pierce, P.L.C.

(57) ABSTRACT

An image processing method includes determining a first bandwidth based on original image data; computing a filter coefficient array for implementing frequency characteristics corresponding to a band limitation using the first bandwidth; generating first filtered image data by subjecting the original image data to a filtering process using the first filter coefficient array; deriving an objective image-quality estimation value of the first filtered image data, and computing an allocation coefficient used for determining an optimum bandwidth, based on the objective image-quality estimation value; determining the optimum bandwidth corresponding to the computed allocation coefficient by referring to a table in which a correspondence relationship between the allocation coefficient and the optimum bandwidth is defined; computing an optimum filter coefficient array for implementing the frequency characteristics corresponding to a band limitation using the optimum bandwidth; and generating optimum filtered image data by subjecting the original image data to a filtering process using the optimum filter coefficient array.

9 Claims, 11 Drawing Sheets

(56) References Cited

U.S. PATENT DOCUMENTS

| | | | |
|---|---|---|---|
| 5,546,431 A * | 8/1996 | Bazes | 375/350 |
| 6,563,517 B1 * | 5/2003 | Bhagwat et al. | 715/735 |
| 2002/0071611 A1 * | 6/2002 | Rao et al. | 382/251 |
| 2004/0008772 A1 | 1/2004 | Kojima | |
| 2004/0119871 A1 * | 6/2004 | Nobuoka | 348/349 |
| 2004/0221319 A1 * | 11/2004 | Zenoni | 725/132 |
| 2004/0258325 A1 * | 12/2004 | Sasada | 382/275 |
| 2005/0105617 A1 * | 5/2005 | Chono | 375/240.16 |
| 2005/0123038 A1 * | 6/2005 | Otsuka et al. | 375/240.03 |
| 2007/0028002 A1 * | 2/2007 | McCanne | 709/238 |
| 2007/0073878 A1 * | 3/2007 | Issa | 709/225 |
| 2007/0139400 A1 * | 6/2007 | Neuman | 345/204 |
| 2007/0139425 A1 * | 6/2007 | Neuman | 345/520 |
| 2007/0195880 A1 * | 8/2007 | Henocq et al. | 375/240.13 |
| 2008/0079972 A1 * | 4/2008 | Goodwin et al. | 358/1.12 |
| 2008/0225327 A1 * | 9/2008 | Smith | 358/1.15 |
| 2008/0320526 A1 * | 12/2008 | Franceschini et al. | 725/62 |

FOREIGN PATENT DOCUMENTS

| | | |
|---|---|---|
| EP | 1 533 899 A1 | 5/2005 |
| EP | 1 643 774 A2 | 4/2006 |
| JP | H6-225276 | 8/1994 |
| JP | 2002-170114 A | 6/2002 |
| JP | 2006-53821 A | 2/2006 |
| JP | 2006-53859 A | 2/2006 |
| RU | 2004 124 831 A | 1/2006 |
| WO | 99/13646 | 3/1999 |
| WO | 03/058945 A2 | 7/2003 |
| WO | 2004/025558 A2 | 3/2004 |
| WO | 2004/025558 A3 | 3/2004 |

OTHER PUBLICATIONS

Sun, X.Z., et al., "Adaptive Schemes for Noise Filtering and Edge Detection by Use of Local Statistics," IEEE Transactions on Circuits and Systems, vol. 35, No. 1, Jan. 1988, pp. 57-69.

* cited by examiner

*FIG. 2*

| IMAGE SIZE | FIRST BANDWIDTH $r1$ |
|---|---|
| 4096×2048 | C1 |
| 1920×1080 | C2 |
| 1280×720 | C3 |
| 720×480 | C4 |
| 640×480 | C5 |
| 352×288 | C6 |
| 176×144 | C7 |
| ⋮ | ⋮ |

FIG. 3
IMAGE SIZE 1
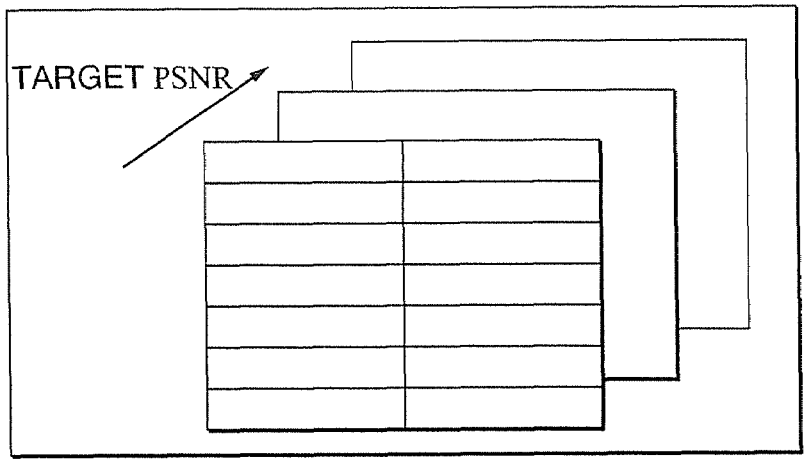
IMAGE SIZE 2
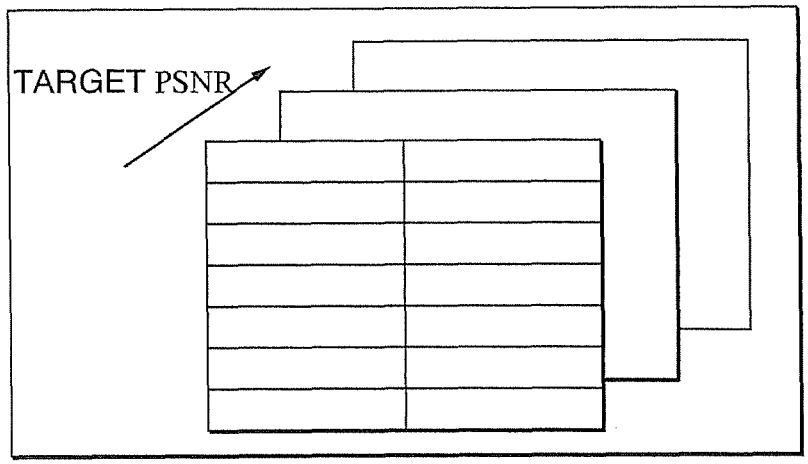
IMAGE SIZE N
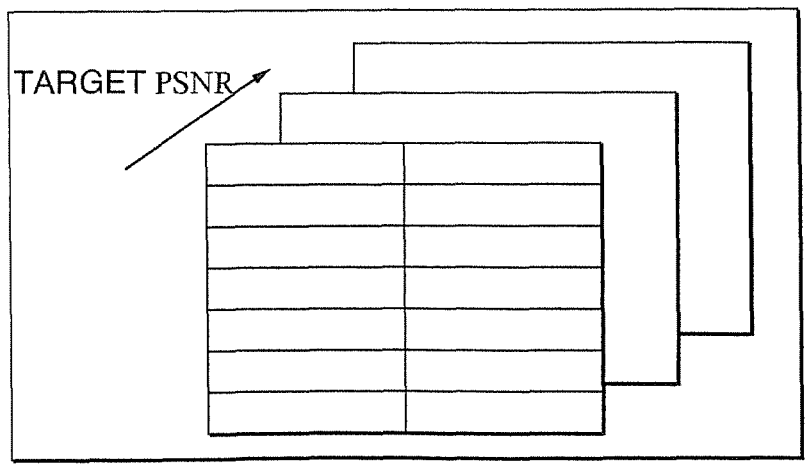

*FIG. 4*

| ALLOCATION COEFFICIENT X | OPTIMUM BANDWIDTH r2 |
|---|---|
| $X < A_1$ | $B_1$ |
| $A_1 \leq X < A_2$ | $B_2$ |
| $A_2 \leq X < A_3$ | $B_3$ |
| ⋮ | ⋮ |
| $A_{n-3} \leq X < A_{n-2}$ | $B_{n-2}$ |
| $A_{n-2} \leq X < A_{n-1}$ | $B_{n-1}$ |
| $A_{n-1} \leq X$ | $B_n$ |

$0 < A_1 < A_2 < A_3 < \cdots < A_{n-2} < A_{n-1}$

IMAGE PROCESSING METHOD AND APPARATUS, IMAGE PROCESSING PROGRAM, AND STORAGE MEDIUM WHICH STORES THE PROGRAM

TECHNICAL FIELD

The present invention relates to an image processing method and a corresponding apparatus, used for performing a simplified filtering operation for transforming an original image into an image having a specific objective image estimation value, and also relates to an image processing program used for implementing the image processing method, and a computer-readable storage medium which stores the program.

Priority is claimed on Japanese Patent Application No. 2006-182931, filed Jul. 3, 2006, the contents of which are incorporated herein by reference.

BACKGROUND ART

It is known that a prefilter, which is often used in a preprocess of video encoding, is effective for reducing block distortion, mosquito noise, or the like, accompanied with encoding, thereby improving the subjective image quality. The pass bandwidth (called "bandwidth" below) of the used prefilter is limited, so as to reduce noise included in an original image and improve the encoding efficiency. However, if the bandwidth is narrowed too much, the image quality is extremely degraded.

FIG. 7 shows an image processing method including a band limitation.

As shown in FIG. 7, in the image processing method including the band limitation, first, original image data B(1) is input, and is then converted into a frequency component I(1) (see step S100). The frequency component I(1) is subjected to a band limitation using a bandwidth r1 (0<r1<1), so that a frequency component (r1) is obtained (see step S101). The frequency component I(r1) is subjected to image transformation, thereby generating filtered image data B(r1) (see step S102).

When such image processing is applied to all frames of a video image by using the same bandwidth, image quality of each filtered frame is not equal because each frame has the individual frequency characteristics of the image. That is, an image having a large amount of low-frequency components has only a small difference from the original image, and thus degradation in the subjective and objective image qualities is small. However, in an image having a large amount of high-frequency components, edges or the like are smoothed and blurred, which extremely degrades subjective and objective image qualities.

As an objective image estimation value, for example, a PSNR (Peak Signal to Noise Ratio) is often used. With given signal level (S) and noise level (N), the PSNR is indicated by the following formula:

$$PSNR = 20 \times \log_{10}(S/N)$$

In a method for solving the above problem, subjective and objective image quality control is performed by means of a "round-robin" band limitation applied to each image.

FIG. 8 shows the structure of an optimum filtered image generating apparatus 100 for generating optimum filtered image data by performing a "round-robin" band limitation.

As shown in FIG. 8, the optimum filtered image generating apparatus 100 includes an original image data input unit 101, a frequency component analyzing unit 102, a bandwidth manual selecting unit 103, a band limitation unit 104, an image data generating unit 105, a PSNR computing unit 106, an image judgment unit 107, and an optimum band-limited image data output unit 108.

FIG. 9 shows an image processing method of generating optimum filtered image data by performing a "round-robin" band limitation, where the method is executed in the optimum filtered image generating apparatus 100 having the above structure.

In the optimum filtered image generating apparatus 100, first, original image data B(1) is input into the original image data input unit 101, and is then converted into a frequency component I(1) in the frequency component analyzing unit 102 (see step S200).

Next, in the bandwidth manual selecting unit 103, a provisional bandwidth r1 is manually selected (see step S201). Then, in the band limitation unit 104, the converted frequency component I(1) is subjected to a band limitation using the selected bandwidth r1, so as to obtain a frequency component I(r1) (see step S202).

Next, in the image data generating unit 105, the frequency component I(r1) is subjected to an image transformation, thereby generating image data B(r1) (see step S203). In the PSNR computing unit 106, the original image data B(1) is compared with the image data B(r1), so as to compute PSNR (r1) (indicated by "P(r1)" below) (see step S204).

In the image judgment unit 107, it is determined whether or not the computed P(r1) has a desired image quality (see step S205). If it has the desired image quality, the optimum band-limited image data output unit 108 outputs the image data B(r1) as optimum band-limited image data (i.e., optimum filtered image data) (see step S206).

However, it is rare that P(r1) obtained in the first processing turn has a desired image quality. When it does not have the desired image quality, the operation returns to the process (in step S201) performed by the bandwidth manual selecting unit 103, and a bandwidth (r2) is selected again so that the relevant band-limited image has a quality closer to the desired image quality. Then, band limitation, image generation, and PSNR computation are again performed similarly.

That is, the above-described operation is repeated N times until the desired image quality is obtained, and a bandwidth rN, which is obtained finally, is used as an optimum bandwidth for generating image data B(rN) by the optimum band-limited image data output unit 108. The generated image data B(rN) is output as optimum band-limited image data (i.e., optimum filtered image data) (see step S206).

However, in the above method, various video images and all frames which form thereof are subjected to filtering, the subjective or objective image quality of each obtained image signal is estimated, and the relevant operation is repeated in a "round-robin" manner until an equal image quality is obtained for all frames of the video images. In consideration of the required time and cost, when many images are processed, the above method is inappropriate and impracticable.

In order to solve the above problem, in a known technique (see Patent Document 1), image processing is performed by obtaining an optimum bandwidth based on the encoding data of a (video) image.

FIG. 10 shows the structure of an optimum filtered image generating apparatus 200 for generating optimum filtered image data by using encoding data.

As shown in FIG. 10, the optimum filtered image generating apparatus 200 includes an original image data input unit 201, a frequency component analyzing unit 202, an image data encoding unit 203, an optimum limited bandwidth determination unit 204, a band limitation unit 205, an image data generating unit 206, and an optimum band-limited image data output unit 207.

FIG. 11 shows an image processing method of generating optimum filtered image data by using encoding data, where the method is executed in the optimum filtered image generating apparatus 200 having the above structure.

In the optimum filtered image generating apparatus 200, first, original image data B(1) is input into the original image data input unit 201, and is then converted into a frequency component I(1) in the frequency component analyzing unit 202 (see step S300).

Next, in the image data encoding unit 203, the input original image data B(1) is encoded (see step S301). Based on the amount of codes obtained by the relevant encoding, an optimum bandwidth r1 is determined in the optimum limited bandwidth determination unit 204 (see step S302).

In the band limitation unit 205, the converted frequency component I(1) is subjected to a band limitation using the determined bandwidth r1, so as to obtain a frequency component I(r1) (see step S303). In the image data generating unit 206, the frequency component I(r1) is subjected to an image transformation, thereby generating image data B(r1) (see step S304).

Finally, the image data B(r1) is output as optimum band-limited image data (i.e., optimum filtered image data) from the optimum band-limited image data output unit 207 (see step S305).

Accordingly, in the conventional optimum filtered image generating apparatus 200 formed as shown in FIG. 10, after encoding is performed, an optimum bandwidth is determined based on encoding data obtained by the encoding. Therefore, optimum filtered image data is obtained without performing a repetitive operation as required in the optimum filtered image generating apparatus 100 formed as shown in FIG. 8.

Patent Document 1: Japanese Unexamined Patent Application, First Publication No. H06-225276.

Certainly, in accordance with the conventional optimum filtered image generating apparatus 200 formed as shown in FIG. 10, optimum filtered image data can be generated without performing a repetitive operation as required in the optimum filtered image generating apparatus 100 formed as shown in FIG. 8.

However, in the optimum filtered image generating apparatus 200 of FIG. 10, after encoding is performed, the optimum bandwidth is determined based on encoding data obtained by the encoding.

In such a method using encoding data, a band limitation process and an encoding process are inseparable. Therefore, even if the user would like to perform only a prefiltering process using the optimum bandwidth, encoding is also necessary. If encoding is also performed after the prefiltering process, encoding would be performed twice. In particular, if the image size is large, considerable processing time is required.

In consideration of the above, in order to optimize the bandwidth for the prefilter, it is preferable to employ a method which can simplify the relevant processing and can be voluntarily controlled using, for example, the PSNR (as a standard for estimating the objective image quality), in comparison with a method using encoding data (e.g., the amount of codes).

DISCLOSURE OF INVENTION

In light of the above circumstances, an object of the present invention is to provide a novel image processing technique, by which an adaptive filtering process for images can be automatically performed without executing an encoding process, so that a simplified adaptive filtering process is implemented and all frames of a video image have high subjective image quality and an equal objective image-quality estimation value.

Therefore, the present invention provides an image processing apparatus comprising: (1) a device for determining a first bandwidth based on the image size of input original image data; (2) a device for computing a first filter coefficient array for implementing frequency characteristics corresponding to a band limitation using the first bandwidth; (3) a device for generating first filtered image data by subjecting the original image data to a filtering process using the first filter coefficient array; (4) a device for deriving an objective image-quality estimation value of the first filtered image data, and computing an allocation coefficient used for determining an optimum bandwidth, based on the objective image-quality estimation value; (5) a device for determining the optimum bandwidth corresponding to the computed allocation coefficient by referring to an optimum bandwidth determination table in which a correspondence relationship between the allocation coefficient and the optimum bandwidth is defined; (6) a device for computing an optimum filter coefficient array for implementing the frequency characteristics corresponding to a band limitation using the determined optimum bandwidth; and (7) a device for generating optimum filtered image data by subjecting the original image data to a filtering process using the optimum filter coefficient array.

The above structure may employ a first bandwidth determination table in which a correspondence relationship between the image size and the first bandwidth is defined. In such a case, the device for determining the first bandwidth determines the first bandwidth corresponding to the image size of the original image data by referring to the first bandwidth determination table.

In addition, a plurality of the optimum bandwidth determination tables may be provided in correspondence to the image size and a target objective image-quality estimation value. In such a case, the device for determining the optimum bandwidth selects the optimum bandwidth determination table, which corresponds to the image size of the original image data and a designated target objective image-quality estimation value, and determines the optimum bandwidth corresponding to the allocation coefficient (computed by the allocation coefficient computing device) by referring to the selected optimum bandwidth determination table.

An image processing method of the present invention, which is implemented when the above-described devices operate, can also be implemented using a computer program. Such a computer program may be provided by storing it in an appropriate computer-readable storage medium, or via a network. When the present invention is implemented, the program is installed and operates on a control device such a CPU.

In the image processing apparatus implemented as described above, when the original image data is input, the first bandwidth in accordance with the image size of the original image data is determined by, for example, referring to the first bandwidth determination table.

Next, the first filter coefficient array for implementing the frequency characteristics corresponding to a band limitation using the determined first bandwidth is computed, and the original image data is subjected to a filtering process using the computed first filter coefficient array, thereby generating the first filtered image data.

Next, in an example in which a PSNR is used as the objective image-quality estimation value, a PSNR of the generated first filtered image data for the original image data is derived, and based thereon, a PSNR, which is obtained when no band limitation is applied to the original image data, may be divided by the above derived PSNR, so as to compute the allocation coefficient used for determining the optimum bandwidth.

Next, the optimum bandwidth determination table corresponding to the image size of the original image data and a designated target PSNR is selected, and the optimum bandwidth corresponding to the computed allocation coefficient is determined by referring to the selected optimum bandwidth determination table.

Next, the optimum filter coefficient array for implementing the frequency characteristics corresponding to a band limitation using the determined optimum bandwidth is computed, and the original image data is subjected to a filtering process using the optimum filter coefficient array, thereby generating the optimum filtered image data.

In accordance with the present invention, a filtering process for transforming an original image into an image having a specific objective image-quality estimation value can be automatically performed without executing an encoding process.

Therefore, in accordance with the present invention, it is possible to automatically perform an adaptive filtering process, by which all frames of a video image have high subjective image quality and an equal objective image-quality estimation value, without executing an encoding process. Therefore, it is possible to perform a simplified and intelligent band limitation.

BRIEF DESCRIPTION OF THE DRAWINGS

FIG. 2 is a diagram used for explaining the first bandwidth determination table.

FIG. 3 is a diagram used for explaining the optimum bandwidth determination table.

FIG. 4 is also a diagram used for explaining the optimum bandwidth determination table.

BEST MODE FOR CARRYING OUT THE INVENTION

Below, the present invention will be explained in detail in accordance with an embodiment.

Figure 1:
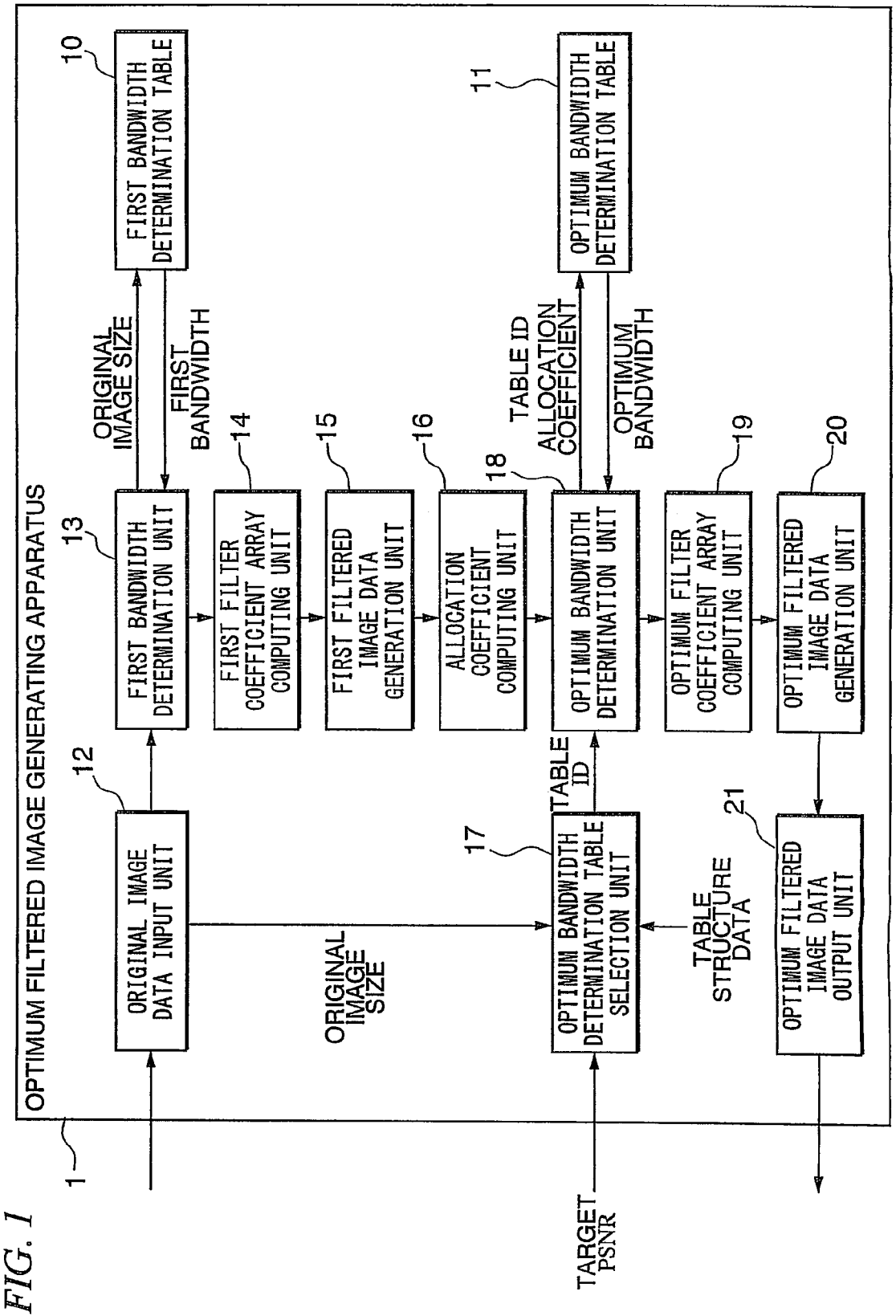
FIG. 1 shows an optimum filtered image generating apparatus as an embodiment of the present invention.

FIG. 1 shows an optimum filtered image generating apparatus 1 as an embodiment of the present invention.

In accordance with the optimum filtered image generating apparatus 1 of the present embodiment, an adaptive filtering process for images can be automatically performed without executing an encoding process, so that a simplified adaptive filtering process is implemented and all frames of a video image have high subjective image quality and an equal PSNR. Therefore, the optimum filtered image generating apparatus 1 includes a first bandwidth determination table 10 (actually, a storage unit for storing a first bandwidth determination table); an optimum bandwidth determination table 11 (actually, a storage unit for storing optimum bandwidth determination tables); an original image data input unit 12; a first bandwidth determination unit 13; a first filter coefficient array computing unit 14; a first filtered image data generation unit 15, an allocation coefficient computing unit 16; an optimum bandwidth determination table selection unit 17; an optimum bandwidth determination unit 18; an optimum filter coefficient array computing unit 19; an optimum filtered image data generation unit 20; and an optimum filtered image data output unit 21.

As shown in FIG. 2, the first bandwidth determination table 10 manages data of the value of a first bandwidth r1 in association with each image size, where the first bandwidth r1 is used for processing an image of the corresponding image size. For example, the correspondence relationship between the image size and the first bandwidth r1 is managed in a manner such that the first bandwidth r1 is C1 for an image having an image size of 4096×2048 pixels, and r1 is C2 for an image having an image size of 1920×1080 pixels.

Here, the table is set in a manner such that the larger the image size, the smaller the first bandwidth r1. Therefore, the values Ci of the first bandwidth r1 shown in FIG. 2 have the following relationship:

$$0<C1<C2<C3<C4<C5<C6<C7<\ldots<1$$

The first bandwidth determination table 10 of FIG. 2 has a table structure which shows a value of the first bandwidth r1 for each image size. However, another table structure may be employed, which shows a value of the first bandwidth r1 for each image size range.

As shown in FIG. 3, in the optimum bandwidth determination table 11, a plurality of target PSNRs are assigned to each image size, and a plurality of tables for all combinations are provided. As shown in FIG. 4, each table for each target PSNR assigned to an image size manages data of the value of an optimum bandwidth r2 (used for implementing the target PSNR) assigned to each allocation coefficient X (explained later) within a value range thereof.

For example, the correspondence relationship between the range of the allocation coefficient X and the optimum bandwidth r2 (used for implementing the target PSNR) is managed in a manner such that the optimum bandwidth r2 is: $B_1$ for each allocation coefficient X within a range of $X<A_1$; $B_2$ for each allocation coefficient X within a range of $A_1 \leq X<A_2$; and $B_3$ for each allocation coefficient X within the range of $A_2 \leq X<A_3$.

$A_i$ (i=1 to n−1) has the following relationship:

$$0<A_1<A_2<A_3<\ldots<A_{n-2}<A_{n-1}$$

In accordance with the setting such that the larger the allocation coefficient X, the larger the optimum bandwidth r2, the following relationship is also obtained:

$$0<B_1<B_2<B_3<\ldots<B_{n-2}<B_{n-1}<B_n<1$$

The original image data input unit 12 receives original image data B(1) for which optimum filtered image data is generated, and determines the image size V of the original image data B(1).

The first bandwidth determination unit 13 refers to the first bandwidth determination table 10 by using the image size V (determined by the original image data input unit 12) as a key, so as to determine the first bandwidth r1 defined in correspondence to the image size V.

The first filter coefficient array computing unit 14 computes a first filter coefficient array for implementing the frequency characteristics corresponding to the band limitation using the first bandwidth r1 determined by the first bandwidth determination unit 13.

The first filtered image data generation unit 15 subjects the original image data B(1) to a filtering process using the first filter coefficient array which is computed by the first filter coefficient array computing unit 14, so as to generate a first filtered image data B(r1).

The allocation coefficient computing unit 16 compares the original image data B(1) with the first filtered image data B(r1) generated by the first filtered image data generation unit 15, so as to measure P(r1), which is a PSNR of the first filtered image data B(r1). The allocation coefficient computing unit 16 computes the allocation coefficient X based on P(r1).

The optimum bandwidth determination table selection unit 17 selects one of the optimum bandwidth determination tables 11, which are provided in association with the image size and the target PSNR, where the selected one corresponds to the image size V (determined by the original image data input unit 12) and the target PSNR which is designated by the user. The optimum bandwidth determination table selection unit 17 outputs an ID number assigned to the selected table.

The optimum bandwidth determination unit 18 determines the optimum bandwidth r2 by referring to the optimum bandwidth determination table 11, which is selected by the optimum bandwidth determination table selection unit 17 and is indicated by the ID number, by using the allocation coefficient X (computed by the allocation coefficient computing unit 16) as a key.

The optimum filter coefficient array computing unit 19 computes an optimum filter coefficient array for implementing the frequency characteristics corresponding to the band limitation using the optimum bandwidth r2, which is determined by the optimum bandwidth determination unit 18.

The optimum filtered image data generation unit 20 subjects the original image data B(1) to a filtering process using the optimum filter coefficient array computed by the optimum filter coefficient array computing unit 19, so as to generate optimum filtered image data B(r2).

The optimum filtered image data output unit 21 outputs the optimum filtered image data generated by the optimum filtered image data generation unit 20.

Figure 5:
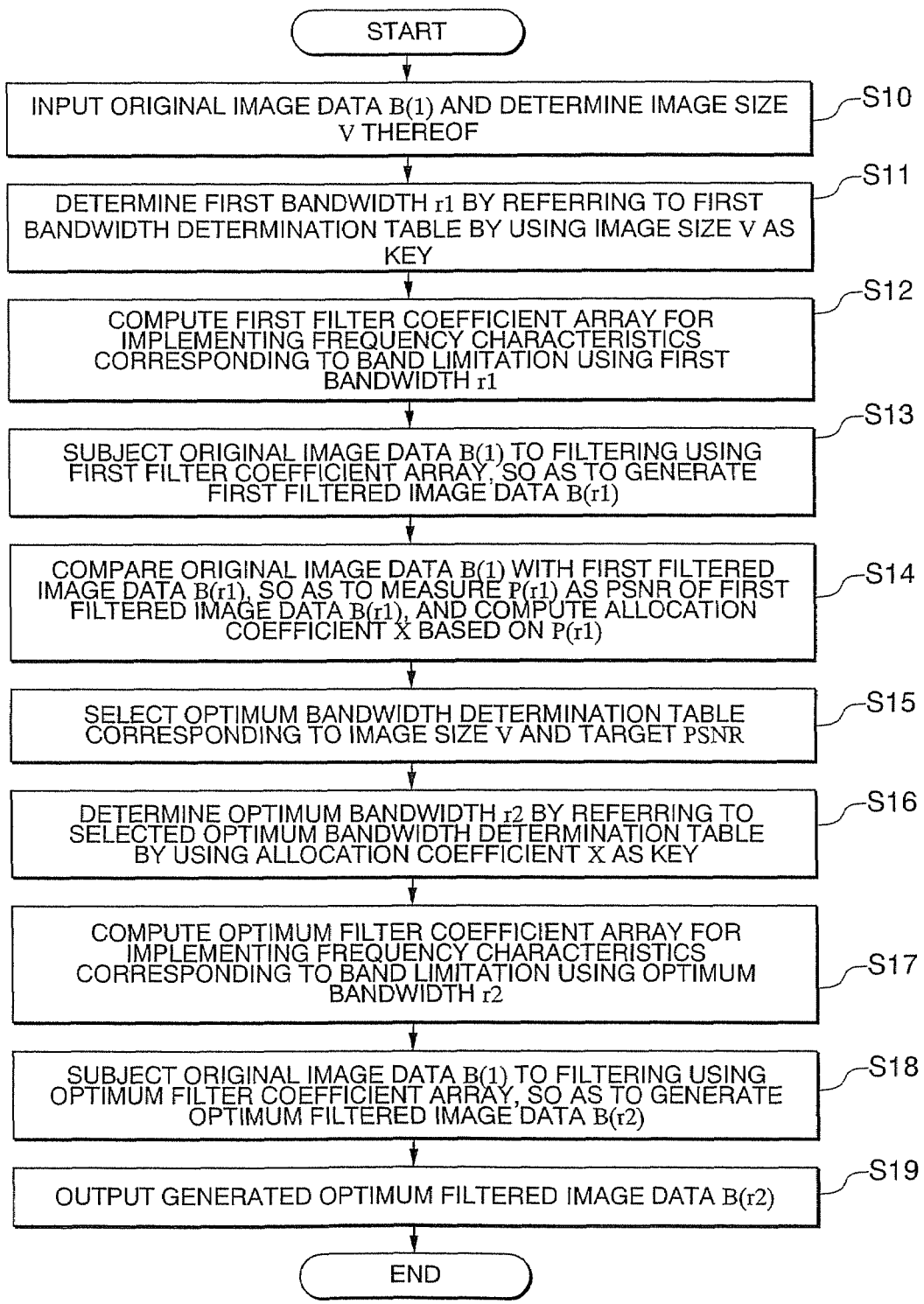
FIG. 5 is an operation flow executed by the optimum filtered image generating apparatus of the embodiment.

FIG. 5 shows an operation flow executed by the optimum filtered image generating apparatus 1 of the present embodiment, formed as described above.

In accordance with the operation flow, the processes performed by the optimum filtered image generating apparatus 1 of the present embodiment will be explained in detail.

As shown in the operation flow of FIG. 5, when the optimum filtered image generating apparatus 1 receives a request for generating optimum filtered image data, the original image data B(1), for which the optimum filtered image data is generated, is input into the apparatus, and the image size V of the input original image B(1) is determined (see the first step S10).

In the next step S11, the first bandwidth determination table 10 is referred to by using the determined image size V as a key, so that the first bandwidth r1 is determined, which is defined in correspondence to the image size V.

If the image size V of the original image data B(1), which is handled in the optimum filtered image generating apparatus 1 of the present embodiment, is fixed to a predetermined size, no first bandwidth determination table 10 is necessary, and the first bandwidth r1, which is defined in advance in correspondence to the fixed size, is determined.

In the next step S12, the first filter coefficient array for implementing the frequency characteristics corresponding to the band limitation using the determined first bandwidth r1 is computed.

In the next step S13, the original image data B(1) is subjected to the filtering process using the computed first filter coefficient array, so that the first filtered image data B(r1) is generated.

In the next step S14, the original image data B(1) is compared with the generated first filtered image data B(r1), so that P(r1), which is the PSNR of the first filtered image data B(r1), is measured. Based on P(r1), the allocation coefficient X is computed.

For example, the allocation coefficient X is computed using P(r1) as follows:

$$X=51.2/P(r1) \hspace{2cm} \text{Formula (1)}$$

Figure 6:
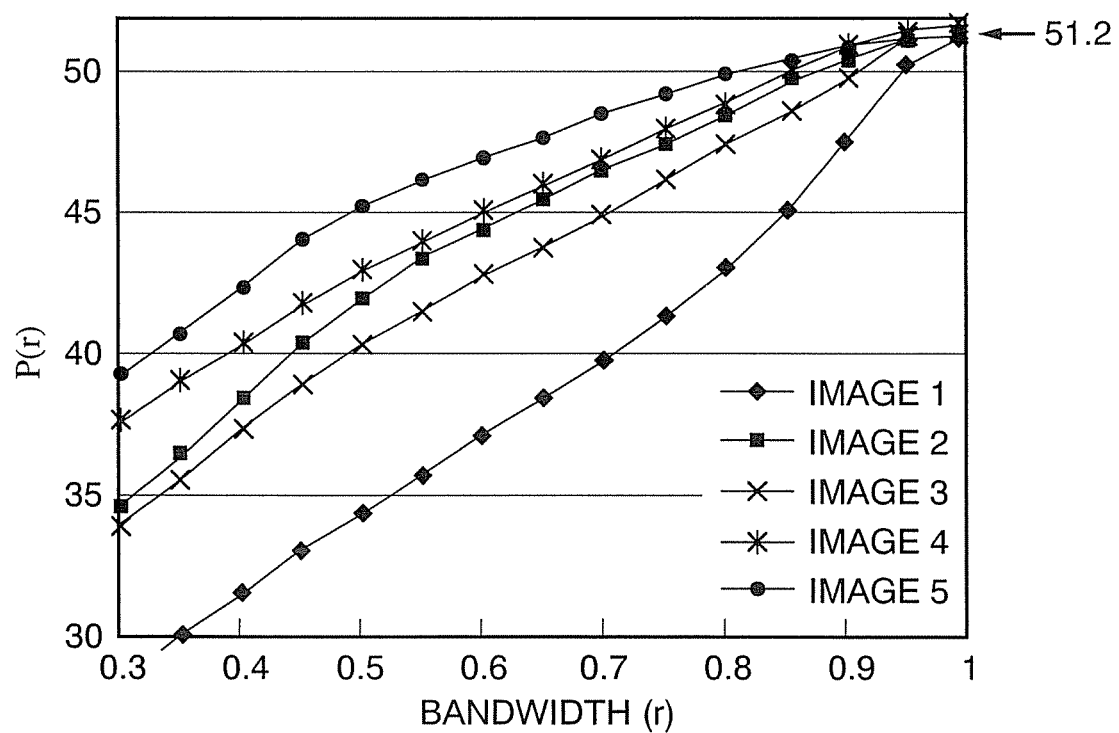
FIG. 6 is a diagram used for explaining the results of experiments for obtaining correspondence relationships between the bandwidth and the PSNR.
Figure 7:
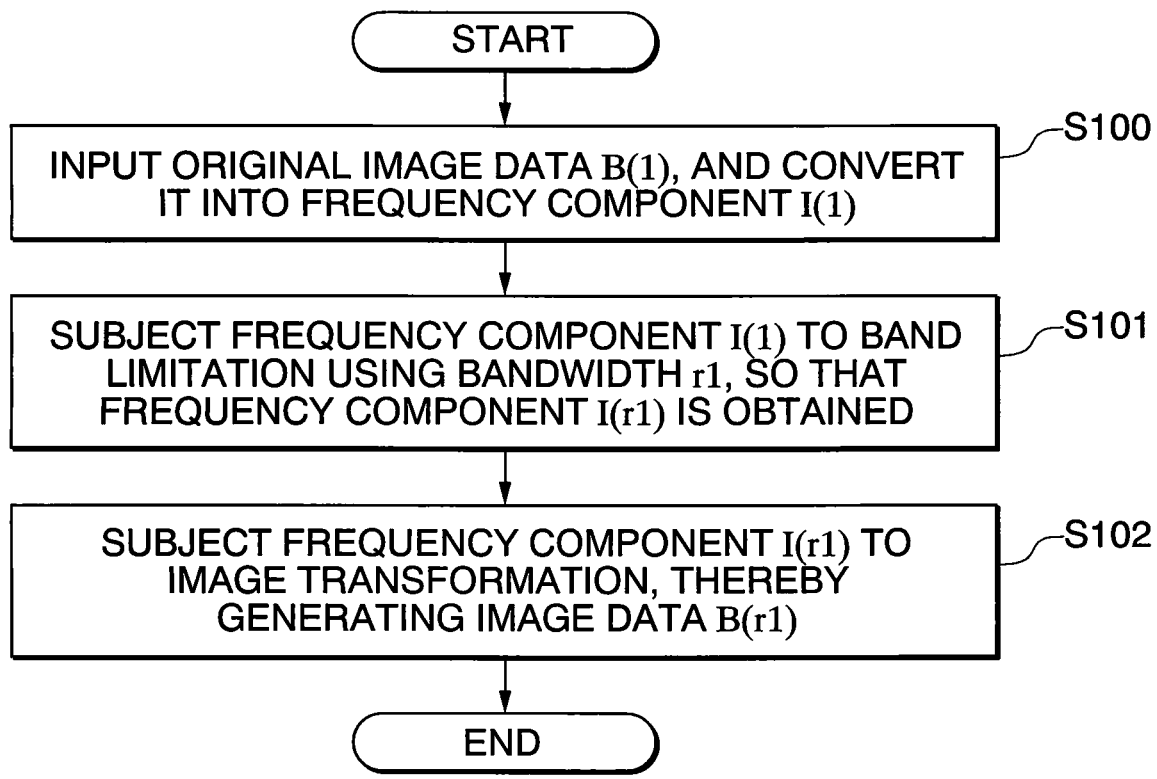
FIG. 7 is a diagram used for explaining an image processing method including a band limitation.
Figure 8:
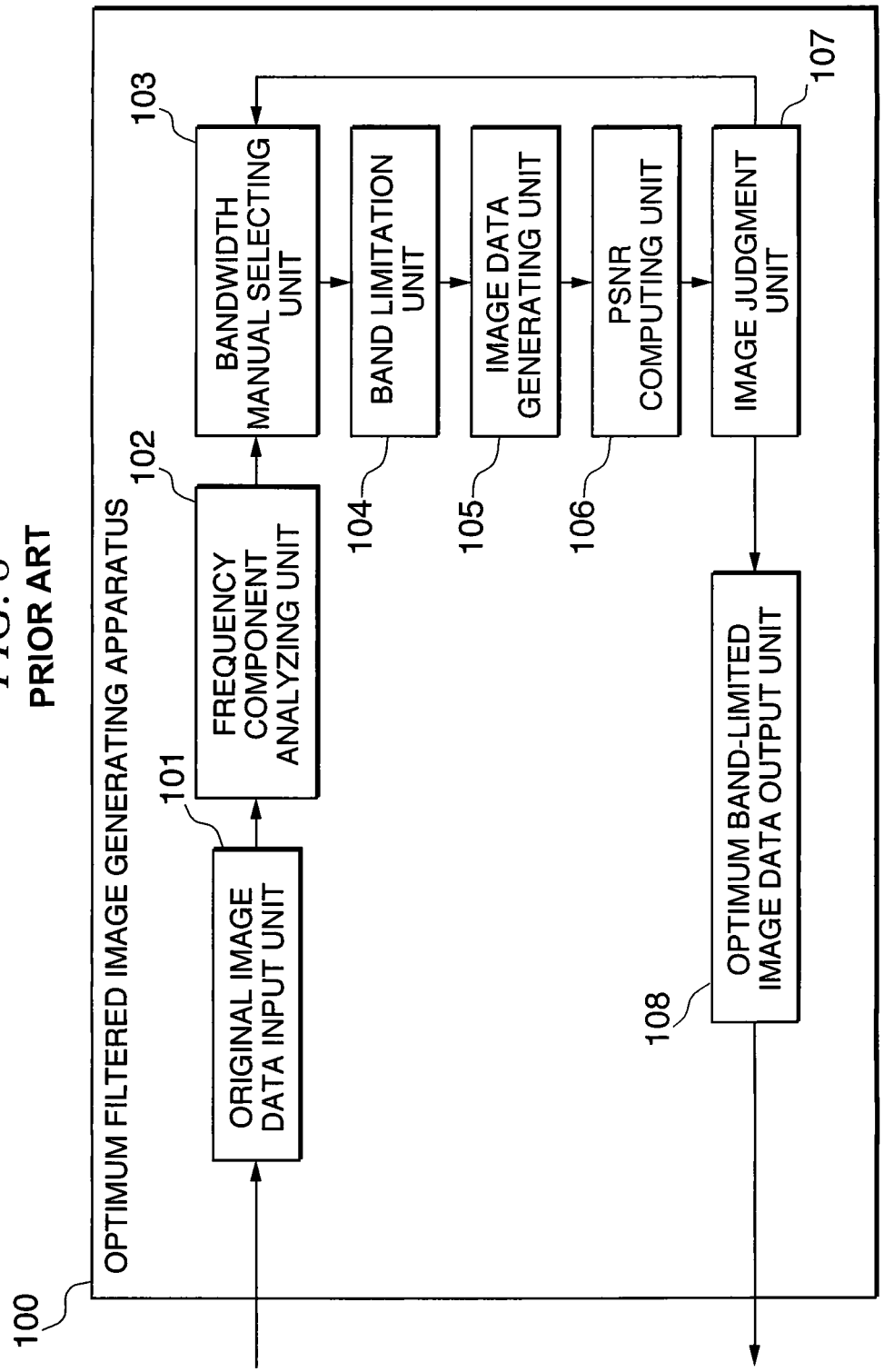
FIG. 8 shows the structure of an optimum filtered image generating apparatus for generating optimum filtered image data by performing a "round-robin" band limitation.
Figure 9:
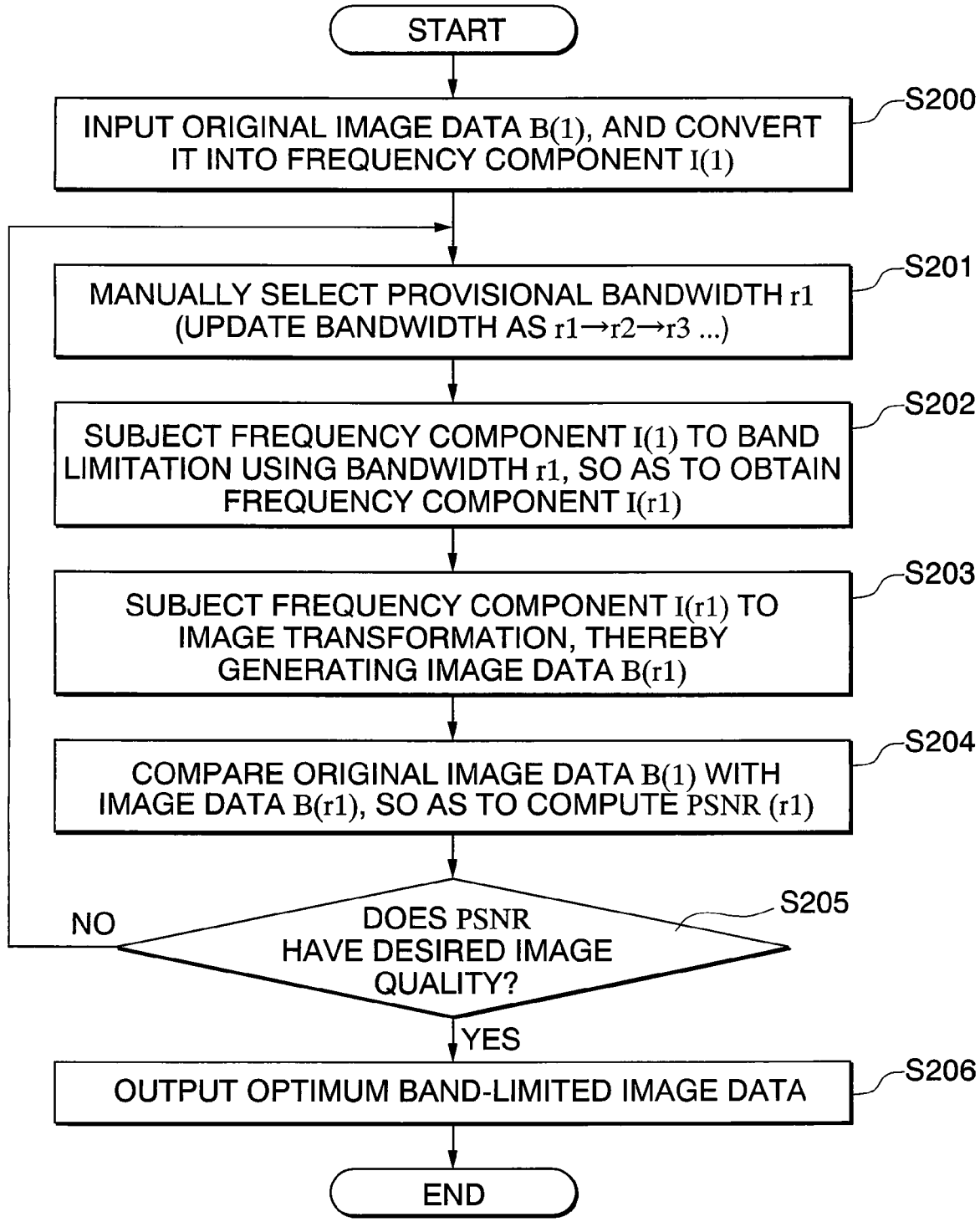
FIG. 9 is an operation flow executed by the optimum filtered image generating apparatus for generating optimum filtered image data by performing a "round-robin" band limitation.
Figure 10:
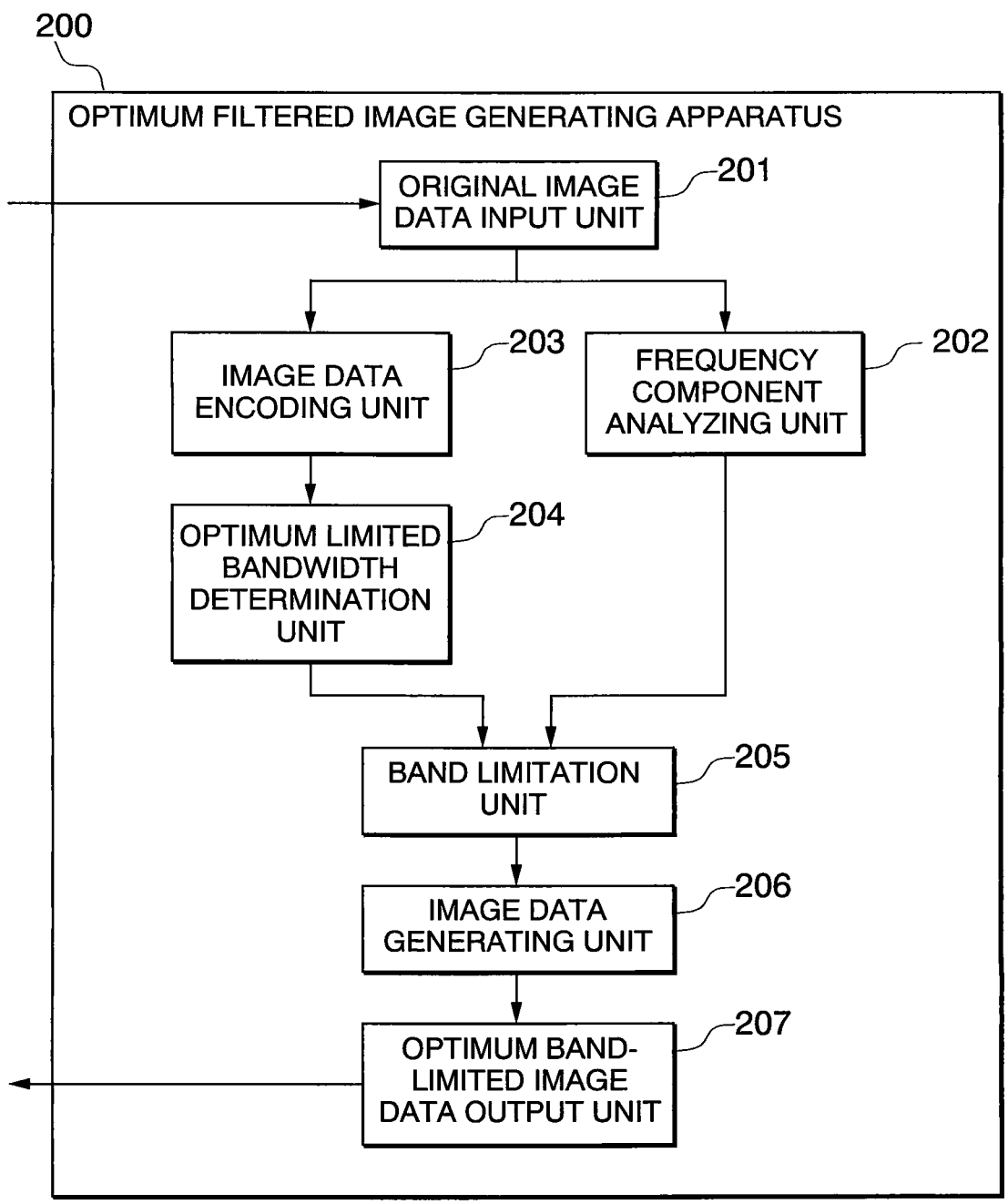
FIG. 10 shows the structure of a conventional optimum filtered image generating apparatus.
Figure 11:
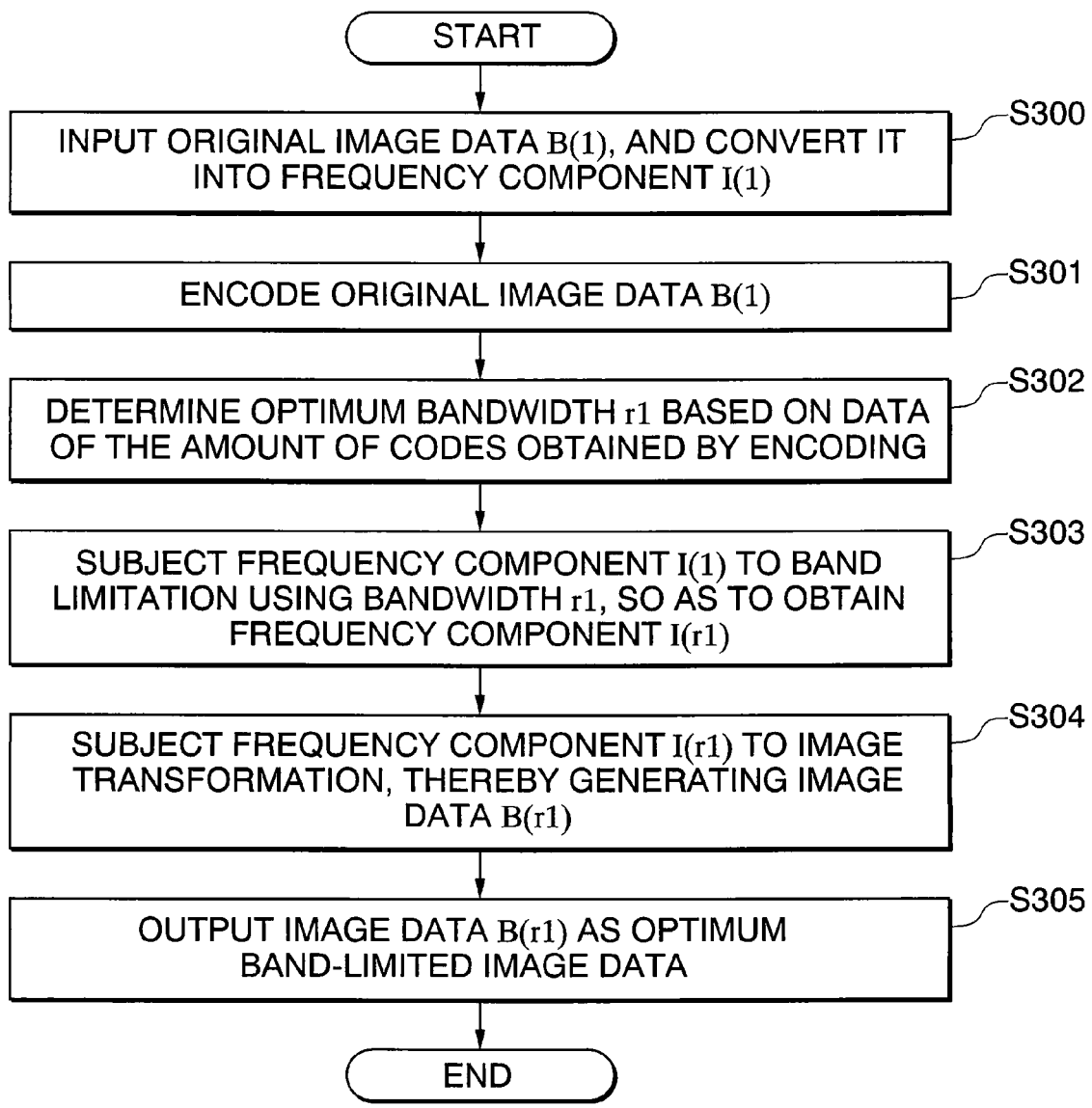
FIG. 11 is an operation flow executed by the conventional optimum filtered image generating apparatus.

FIG. 6 shows the results of experiments for obtaining correspondence relationships between the bandwidth r and P(r) (PSNR value), where five different images 1 to 5, each having an image size of 1920×1080 pixels, were used as image data for the experiments, and filtering was applied to the brightness components of the images 1 to 5 by using a filter coefficient array for implementing the frequency characteristics corresponding to the equal bandwidth r (0.3<r<1) in both the horizontal and vertical directions.

As shown by the results of the experiments, the value "51.2" in Formula 1 indicates the PSNR value, which is obtained when the original image data is not subjected to band limitation.

In the next step S15, one of the optimum bandwidth determination tables 11, which are provided in association with the image size V and the target PSNR, is selected, where the selected one corresponds to the image size V (determined by the original image data input unit 12) and the target PSNR which is designated by the user.

If the image size V of the original image data B(1), which is handled in the optimum filtered image generating apparatus 1 of the present embodiment, is fixed to a predetermined size, it is unnecessary to provide the optimum bandwidth determination tables 11 in association with the image size and the target PSNR, and a plurality of the optimum bandwidth determination tables 11 in association with the values of the target PSNR are provided.

Additionally, if the image size V of the original image data B(1), which is handled in the optimum filtered image generating apparatus 1, is fixed to a predetermined size, and the target PSNR, which is handled in the optimum filtered image generating apparatus 1, is also fixed to a predetermined value, then it is unnecessary to provide the optimum bandwidth determination tables 11 in association with the image size and the target PSNR, and a single optimum bandwidth determination table 11 corresponding to the target PSNR is provided.

In the next step S16, the optimum bandwidth r2 is determined by referring to the selected optimum bandwidth determination table 11 by using the computed allocation coefficient X as a key.

In the next step S17, the optimum filter coefficient array for implementing the frequency characteristics corresponding to the band limitation using the determined optimum bandwidth r2 is computed.

In the next step S18, the original image data B(1) is subjected to the filtering using the computed optimum filter coefficient array, so that the optimum filtered image data B(r2) for implementing the target PSNR is generated.

In the next step S19, the generated optimum filtered image data B(r2) is output, and the relevant operation is completed.

As described above, the optimum filtered image generating apparatus 1 of the present embodiment performs only two filtering processes applied to the original image data B(1), so as to generate the optimum filtered image data B(r2) for implementing the target PSNR.

Below, the above-described operation will be concretely explained for concrete examples, which are the images 1 to 5 having the characteristics shown in FIG. 6.

In accordance with the process of the above-described step S10, the size "1920×1080 pixels" is determined as the image size V of the original image data B(1). Next, in accordance with the process of the above-described step S11, the first bandwidth determination table 10 having the data structure as shown in FIG. 2 is referred to, so that C2 is determined as the first bandwidth r1.

If C2=0.5, then in accordance with the processes of the above-described steps S12 to S14, the first filter coefficient array for implementing the frequency characteristics corresponding to the band limitation using r1(=0.5) is used for generating the first filtered image data B(0.5) for each of the images 1 to 5 (having the characteristics of FIG. 6), and P(0.5) as the PSNR of each first filtered image data B(0.5) is measured.

In accordance with the measurement, as shown in FIG. 6, P(0.5)=34.5 for image 1; P(0.5)=42.3 for image 2; P(0.5)=40.6 for image 3; P(0.5)=42.7 for image 4, and P(0.5)=45.3 for image 5.

Then, in accordance with the process of the above-described step S14, the formula "X=51.2/P(r1)" is computed so that: the allocation coefficient X=1.48 for image 1; the allocation coefficient X=1.21 for image 2; the allocation coefficient X=1.26 for image 3; the allocation coefficient X=1.20 for image 4; and the allocation coefficient X=1.13 for image 5.

Next, in accordance with the process of the above-described step S16, the optimum bandwidth determination table 11 having the data structure as shown in FIG. 4 is referred to by using the computed allocation coefficient X as a key, so that the value $B_i$ is determined as the optimum bandwidth r2 in correspondence to the value of the allocation coefficient X.

As described above, the optimum bandwidth determination table 11 has the following data structures:

$$0 < A_1 < A_2 < A_3 < \ldots < A_{n-2} < A_{n-1}$$

$$0 < B_1 < B_2 < B_3 < \ldots < B_{n-2} < B_{n-1} < B_n < 1$$

Therefore, a larger optimum bandwidth r2 is assigned to original image data B(1) having a larger allocation coefficient X, and a smaller optimum bandwidth r2 is assigned to original image data B(1) having a smaller allocation coefficient X.

That is, as understood by the formula "X=51.2/P(r1)", original image data B(1) having a larger allocation coefficient X has a smaller P(r1) (which indicates a smaller signal level); therefore, in order to implement the target PSNR, a larger optimum bandwidth r2 is required (i.e., band limitation should be relieved). In contrast, original image data B(1) having a smaller allocation coefficient X has a larger P(r1); therefore, in order to implement the target PSNR, a smaller optimum bandwidth r2 is required.

In consideration of the above, in order to indicate that a larger optimum bandwidth r2 is assigned to original image data B(1) having a larger allocation coefficient X, and a smaller optimum bandwidth r2 is assigned to original image data B(1) having a smaller allocation coefficient X, the optimum bandwidth determination table 11 has the data structures:

$$0 < A_1 < A_2 < A_3 < \ldots < A_{n-2} < A_{n-1}$$

$$0 < B_1 < B_2 < B_3 < \ldots < B_{n-2} < B_{n-1} < B_1 < 1$$

The optimum bandwidth r2 as determined above is a bandwidth for generating the optimum filtered image data B(r2) which implements the target PSNR. Therefore, in accordance with the processes of the above-described steps S16 to S17, the optimum filter coefficient array for implementing the frequency characteristics corresponding to the band limitation using the optimum bandwidth r2 is computed, and the original image data B(1) is subjected to the filtering using the optimum filter coefficient array, thereby generating the optimum filtered image data B(r2) for implementing the target PSNR.

As described above, in the optimum filtered image generating apparatus 1, first, a provisional bandwidth is determined in accordance with the image size of the original image data, and based on the image size, provisional filtered image data is generated so as to measure the PSNR. Then, a dimensionless parameter such as the allocation coefficient is computed based on the measured PSNR, and the optimum bandwidth determination table 11 is referred to by using the computed allocation coefficient as a key, so as to determine an optimum bandwidth for implementing the target PSNR, where the optimum bandwidth determination table 11 has a data conversion structure by which the larger the allocation coefficient of the original image data, the larger the determined optimum bandwidth. Based on the optimum bandwidth, optimum filtered image data for the original image data is generated.

In accordance with the optimum filtered image generating apparatus 1 having the above structure, the original image data should be subjected to only two filtering processes, so as to generate optimum filtered image data for implementing the target PSNR.

Therefore, in accordance with the optimum filtered image generating apparatus 1, an adaptive filtering process can be automatically performed without executing an encoding process, so that a simplified adaptive filtering process is implemented and all frames of a video image have high subjective image quality and an equal objective image-quality estimation value.

Although the present invention has been explained in accordance with the embodiment having the drawings, the present invention is not limited to the embodiment.

For example, in the present embodiment, the PSNR is used as an objective image-quality estimation value. However, an objective image-quality estimation value other than the PSNR may be employed.

Also in the present embodiment, an image size of 1920× 1080 pixels is shown as an example. However, when the first bandwidth determination table 10 (see FIG. 2), which manages the first bandwidths r1 corresponding to various image sizes (any sizes, for example, so-called 4 k×2 k, HD, SD, VGA, CIF, and QCIF), is prepared and stored in advance, the present invention can be applied to images of any size.

In addition, although no detailed explanation is provided in the above embodiment, when optimum bandwidth determination tables 11 corresponding to various target PSNRs are prepared and stored in advance, image processing for implementing voluntary image-quality control can be performed using the present invention.

Also in the present embodiment, for the first bandwidth r1 and the optimum bandwidth r2, the equal bandwidth is determined in both the horizontal and vertical directions. However, similar effects are obtained when different bandwidths are determined for the horizontal and vertical directions. In a video image showing a natural distant view or a truck, there occurs a larger variation in brightness in the vertical direction in comparison with the horizontal direction because there is attraction in the vertical direction. In order to positively use this effect, different bandwidths are assigned to the horizontal and vertical directions.

Also in the present embodiment, no specific explanation is provided for the number of taps of a digital filter. However, similar effects are obtained when applying the present invention to a digital filter having any number of taps. In addition, no specific limitation is imposed on a method of designing a digital filter for implementing a designated band limitation. For example, a desired frequency-characteristic form may be subjected to an inverse Z conversion, so as to obtain and design a filter coefficient array of a digital filter having the relevant frequency characteristics.

Also in the present embodiment, the value "51.2" is employed in Formula (1). However, the value depends on the characteristics of an employed digital filter, and should be appropriately modified when a different digital filter is used.

Also in the present embodiment, the band processing is applied only to the brightness component. However, the band processing may also be applied to a color-difference component. In such a case, the encoding efficiency can be further improved.

INDUSTRIAL APPLICABILITY

The present invention is provided to implement filtering for transforming an original image into an image having a specific objective image-quality estimation value by a simplified process. Accordingly, the simplified process can implement adaptive filtering for transforming all frames of a video image into images having high subjective image quality and an equal objective image-quality estimation value.

The invention claimed is:
1. An image processing method which is used in a preprocess of video encoding, executes no encoding process, and uses no encoding data, the method comprising the steps of:
    determining a first bandwidth based on the image size of input original image data which has not been encoded;
    computing a first filter coefficient array for implementing frequency characteristics corresponding to a band limitation using the first bandwidth;
    generating first filtered image data by subjecting the original image data to a filtering process using the first filter coefficient array;
    deriving an objective image-quality estimation value of the first filtered image data, and computing an allocation coefficient used for determining an optimum bandwidth, based on the objective image-quality estimation value;
    determining the optimum bandwidth corresponding to the computed allocation coefficient by referring to an optimum bandwidth determination table in which a correspondence relationship between the allocation coefficient and the optimum bandwidth is defined;
    computing an optimum filter coefficient array for implementing the frequency characteristics corresponding to a band limitation using the determined optimum bandwidth; and
    generating optimum filtered image data by subjecting the original image data to a filtering process using the optimum filter coefficient array.
2. The image processing method in accordance with claim 1, wherein:
    in the step of determining the first bandwidth, the first bandwidth corresponding to the image size of the original image data is determined by referring to a first bandwidth determination table in which a correspondence relationship between the image size and the first bandwidth is defined.
3. The image processing method in accordance with claim 1, wherein:
    in the step of determining the optimum bandwidth, when a plurality of the optimum bandwidth determination tables are provided in correspondence to the image size and a target objective image-quality estimation value, the optimum bandwidth determination table, which corresponds to the image size of the original image data and a designated target objective image-quality estimation value, is selected, and the optimum bandwidth corresponding to the computed allocation coefficient is determined by referring to the selected optimum bandwidth determination table.
4. The image processing method in accordance with claim 1, wherein:
    in the step of computing the allocation coefficient, the allocation coefficient is computed by dividing an objective image-quality estimation value, which is obtained when the original image data is not subjected to band limitation, by the derived objective image-quality estimation value.
5. An image processing apparatus which is used in a preprocess of video encoding, executes no encoding process, and uses no encoding data, the apparatus comprising:
    a device for determining a first bandwidth based on the image size of input original image data which has not been encoded;
    a device for computing a first filter coefficient array for implementing frequency characteristics corresponding to a band limitation using the first bandwidth;
    a device for generating first filtered image data by subjecting the original image data to a filtering process using the first filter coefficient array;
    a device for deriving an objective image-quality estimation value of the first filtered image data, and computing an allocation coefficient used for determining an optimum bandwidth, based on the objective image-quality estimation value;
    a device for determining the optimum bandwidth corresponding to the computed allocation coefficient by referring to an optimum bandwidth determination table in which a correspondence relationship between the allocation coefficient and the optimum bandwidth is defined;
    a device for computing an optimum filter coefficient array for implementing the frequency characteristics corresponding to a band limitation using the determined optimum bandwidth; and
    a device for generating optimum filtered image data by subjecting the original image data to a filtering process using the optimum filter coefficient array.
6. The image processing apparatus in accordance with claim 5, wherein:
    the device for determining the first bandwidth determines the first bandwidth corresponding to the image size of the original image data by referring to a first bandwidth determination table in which a correspondence relationship between the image size and the first bandwidth is defined.

7. The image processing apparatus in accordance with claim 5, wherein:

when a plurality of the optimum bandwidth determination tables are provided in correspondence to the image size and a target objective image-quality estimation value, the device for determining the optimum bandwidth:

selects the optimum bandwidth determination table, which corresponds to the image size of the original image data and a designated target objective image-quality estimation value, and determines the optimum bandwidth corresponding to the computed allocation coefficient by referring to the selected optimum bandwidth determination table.

8. The image processing apparatus in accordance with claim 5, wherein:

the device for computing the allocation coefficient computes the allocation coefficient by dividing an objective image-quality estimation value, which is obtained when the original image data is not subjected to band limitation, by the derived objective image-quality estimation value.

9. A non-transitory computer-readable storage medium which stores an image processing program, which instructs a computer to execute a process for implementing an image processing method which executes no encoding process and uses no encoding data, the method comprising the steps of:

determining a first bandwidth based on the image size of input original image data;

computing a first filter coefficient array for implementing frequency characteristics corresponding to a band limitation using the first bandwidth;

generating first filtered image data by subjecting the original image data to a filtering process using the first filter coefficient array;

deriving an objective image-quality estimation value of the first filtered image data, and computing an allocation coefficient used for determining an optimum bandwidth, based on the objective image-quality estimation value;

determining the optimum bandwidth corresponding to the computed allocation coefficient by referring to an optimum bandwidth determination table in which a correspondence relationship between the allocation coefficient and the optimum bandwidth is defined;

computing an optimum filter coefficient array for implementing the frequency characteristics corresponding to a band limitation using the determined optimum bandwidth; and generating optimum filtered image data by subjecting the original image data to a filtering process using the optimum filter coefficient array.

* * * * *